(12) United States Patent
Liu et al.

(10) Patent No.: US 10,359,516 B2
(45) Date of Patent: Jul. 23, 2019

(54) CAMERA SET WITH CONNECTING STRUCTURE

(71) Applicant: LIPS Corporation, Taipei (TW)

(72) Inventors: Ling-Wei Liu, Taipei (TW); Yu-Chuan Shen, Taipei (TW); Cheng-Li Hsieh, Taipei (TW)

(73) Assignee: LIPS CORPORATION (TW)

( * ) Notice: Subject to any disclaimer, the term of this patent is extended or adjusted under 35 U.S.C. 154(b) by 0 days.

(21) Appl. No.: 15/804,010

(22) Filed: Nov. 6, 2017

(65) Prior Publication Data
US 2018/0329059 A1 Nov. 15, 2018

(30) Foreign Application Priority Data
May 15, 2017 (TW) .............................. 106206883 U (51) Int. Cl.
| | |
|---|---|
| *H04N 5/225* | (2006.01) |
| *G01S 17/02* | (2006.01) |
| *H04N 5/247* | (2006.01) |
| *G01S 7/481* | (2006.01) |
| *H04N 5/04* | (2006.01) |
| *H01R 24/64* | (2011.01) |
| *H01R 107/00* | (2006.01) |

(52) U.S. Cl.
CPC .......... *G01S 17/023* (2013.01); *G01S 7/4813* (2013.01); *H04N 5/04* (2013.01); *H04N 5/2251* (2013.01); *H04N 5/2252* (2013.01); *H04N 5/2257* (2013.01); *H04N 5/247* (2013.01); *H01R 24/64* (2013.01); *H01R 2107/00* (2013.01)

(58) Field of Classification Search
None
See application file for complete search history.

(56) References Cited

U.S. PATENT DOCUMENTS

| | | | |
|---|---|---|---|
| 7,050,107 B1 | 5/2006 | Frank et al. | |
| 7,102,686 B1 | 9/2006 | Orimoto et al. | |
| 2004/0150724 A1* | 8/2004 | Nozaki | H04N 1/00347 348/211.4 |
| 2006/0268159 A1* | 11/2006 | Orimoto | G03B 35/08 348/373 |
| 2007/0147827 A1 | 6/2007 | Sheynman et al. | |

(Continued)

*Primary Examiner* — Twyler L Haskins
*Assistant Examiner* — Dwight Alex C Tejano
(74) *Attorney, Agent, or Firm* — Alan D. Kamrath; Mayer & Williams PC (57) ABSTRACT

Camera set with connecting structure includes a main camera and a detachable camera. The main camera includes a main housing with a main camera module mounted therein. A docking structure and a main connector are mounted on a side of the main housing. The main camera module includes a main lens mounted on a front side of the main housing. The detachable camera includes an expanded housing with a detachable camera module mounted therein. A join structure and a first expanded connector are mounted on a side of the expanded housing. The detachable camera module includes an expanded lens mounted on a front side of the expanded housing. A second expanded connector is mounted on the other side of the expanded housing. The main camera can be used individually or can expand functions by being assembled to another camera by the docking structure and join the structures.

14 Claims, 7 Drawing Sheets

(56) References Cited

U.S. PATENT DOCUMENTS

| | | | |
|---|---|---|---|
| 2007/0268371 A1* | 11/2007 | Misawa | H04N 5/2252 348/207.99 |
| 2008/0049110 A1* | 2/2008 | Arbouzov | H04N 5/23203 348/211.99 |
| 2011/0110654 A1* | 5/2011 | Maki | H04N 5/2251 396/49 |
| 2011/0175984 A1* | 7/2011 | Tolstaya | G06K 9/38 348/46 |
| 2012/0270599 A1* | 10/2012 | Mori | H04M 1/0254 455/556.1 |
| 2013/0033484 A1 | 2/2013 | Liao et al. | |
| 2014/0118353 A1 | 5/2014 | Ha et al. | |
| 2014/0300809 A1 | 10/2014 | Oliveira | |

\* cited by examiner

CAMERA SET WITH CONNECTING STRUCTURE

BACKGROUND OF THE INVENTION

1. Field of the Invention

The present invention is related to a camera set and, especially, to a detachable camera set with a connecting structure.

2. Description of the Prior Art

By projecting infrared ray(s) toward an object, a TOF (Time of flight) camera is able to create an image showing a three-dimensional outline of the object. After the infrared ray(s) are reflected by the object, a lens of the TOF camera captures and calculates a time or phase difference between the projected and reflected infrared ray(s) with a sensor. Hence, the distance between the object and the TOF camera is ascertained, and an object depth signal is produced.

Measuring the distance between the object and the TOF camera in the past, a conventional TOF camera had only the capability of creating the image of the object with its three-dimensional outline only. If a user wants to obtain a image/picture in color of the object together with three-dimensional outlines, an additional RGB camera would have to be implemented. In such a scenario, one would be required to implement two cameras at the same time to generate proper signals to integrate/synchronize a depth signal and a color signal created by the TOF camera and the RGB camera respectively.

SUMMARY OF THE INVENTION

In order to solve short comings of the conventional TOF camera, which is only capable of producing one signal function and is difficult integrating one signal with another, the present invention provides a camera set with a docking structure, which comprises a main camera and a detachable camera. The main camera comprises a main housing with a main camera module mounted therein. A docking structure and a main connector are mounted on a side of the main housing. The main camera module comprises a main lens mounted on a front side of the main housing.

The detachable camera comprises an expanded housing with a detachable camera module mounted therein. A join structure and a first expanded connector are mounted on a side of the expanded housing, and the join structure is detachably connected with the docking structure of the main camera. The detachable camera module comprises an expanded lens mounted on a front side of the expanded housing. The expanded connector is electrically connected with the main connector of the main camera. A second expanded connector is mounted on a side of the expanding housing different from the first expanded connector. An electric power of the second expanded connector is equal to or bigger than the main connector of the main camera.

According to the above description, the present invention offers advantages over conventional TOF cameras as follows.

1. The main camera is detachably assembled with the detachable camera by the docking structure and the join structure of the present invention. The main camera can still remain functional even when the two cameras are separated. When the detachable camera is required, it can be easily assembled with the main camera by the docking structure and the join structure as described above. The detachable camera can be electrically connected with the main camera by inserting the first expanded connector to the main connector of the main camera. Thus, the detachable camera is able to not only transfer a signal but also can provide sufficient power to the main camera through the second expanded connector.

2. The main camera of the present invention not only can be used individually, but also can be expanded with other functions by assembling with different cameras. The docking structure and the join structure of the present invention require less assembly effort.

3. Because the main camera and the detachable camera are electrically connected with each other, the signals coming from these two cameras can be integrated and exported out through the second expanded connector of the present invention.

Other objectives, advantages and novel features of the invention will become more apparent from the following detailed description when taken in conjunction with the accompanying drawings.

DETAILED DESCRIPTION OF THE INVENTION

Figure 1:
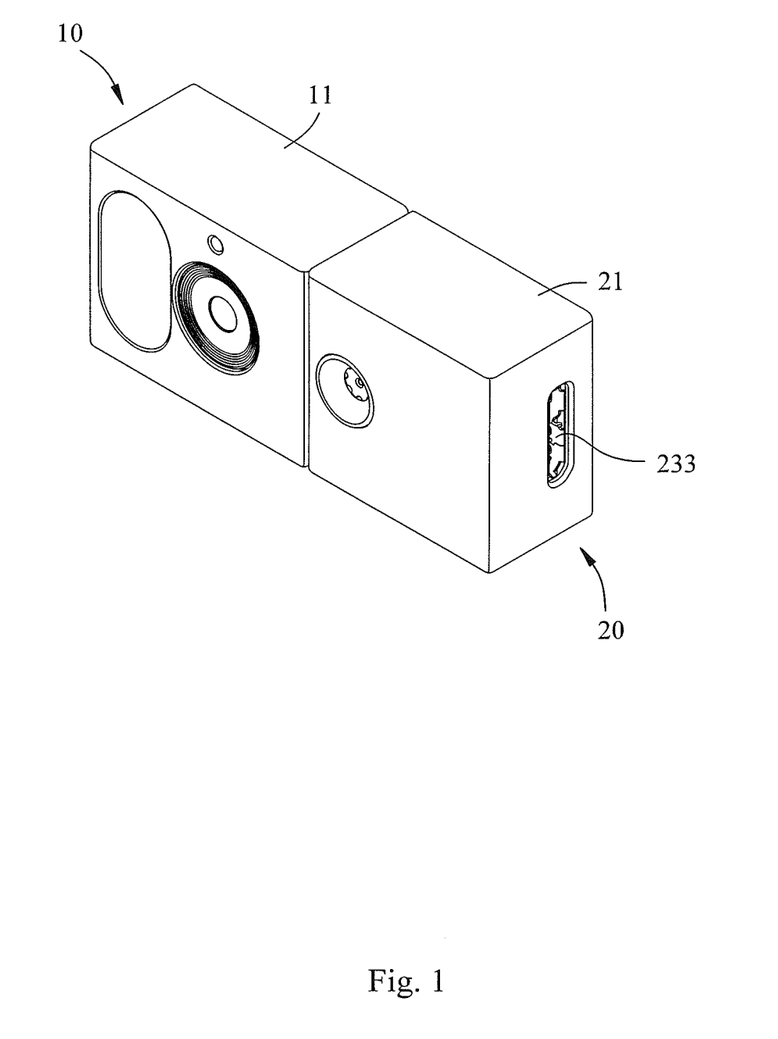
FIG. 1 is an illustration of a first embodiment of a camera set with connecting structure in accordance with the present invention.
Figure 3:
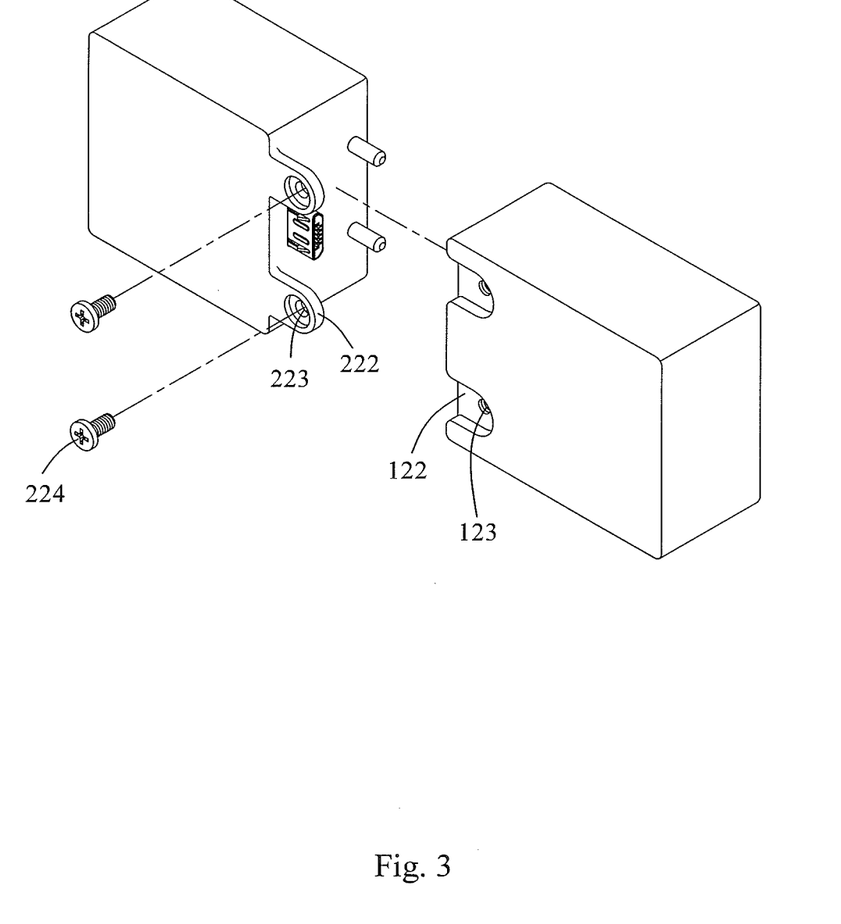
FIG. 3 is another illustration of separate components of the first embodiment of the camera set with connecting structure in accordance with the present invention.

With reference to FIG. 1 and FIG. 3, a first embodiment of the present invention comprises a main camera 10 and a detachable camera 20. The detachable camera 20 is detachably mounted on the main camera 10. The detachable camera 20 preferably has functions different from the main camera 10. Users may choose types of the detachable camera 20 by demand.

Figure 2:
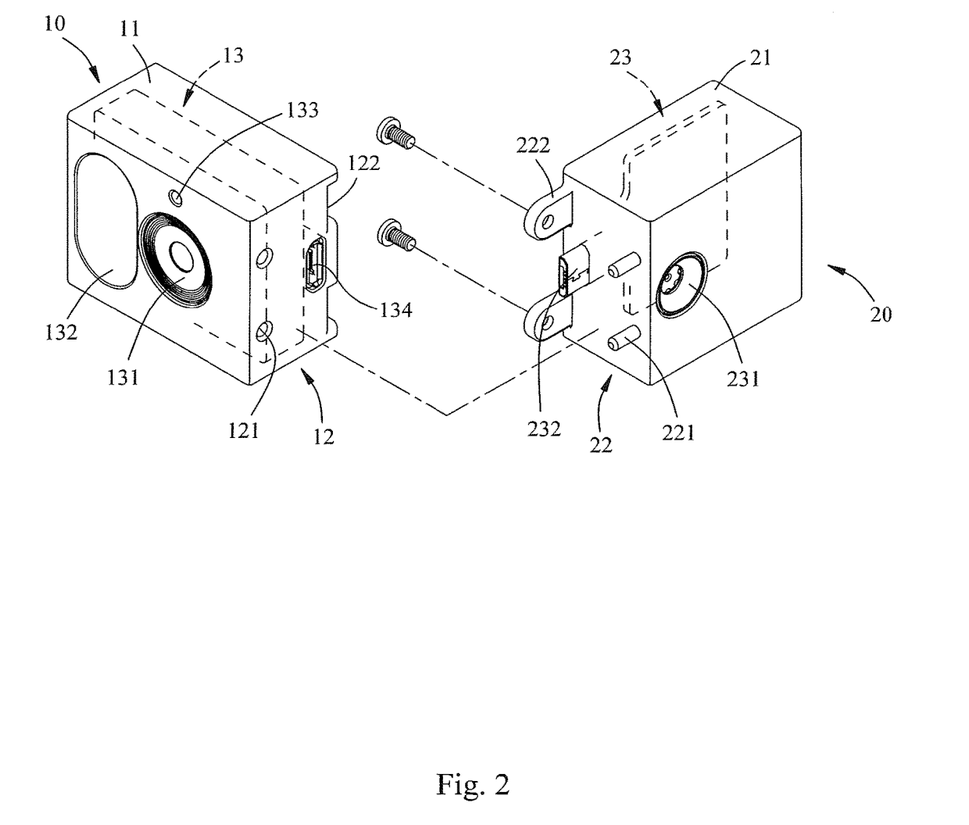
FIG. 2 is an illustration of separate components of the first embodiment of the camera set with connecting structure in accordance with the present invention.

The main camera 10 of the present invention is a TOF (Time of flight) camera having a main housing 11 with a main camera module 13 mounted therein. The main housing 11 in the first embodiment of the present invention is a rectangular case/shell. The main housing 11 comprises a docking structure 12 having at least two pits 121 and at least two grooves 122 formed thereon. The at least two pits 121 are vertically formed on a front part of a side of the main housing 11. The at least two grooves 121 are vertically mounted on a rear part of the side of the main housing 11. Each groove 122 has a screw hole 123 placed in its inner side.

Figure 4:
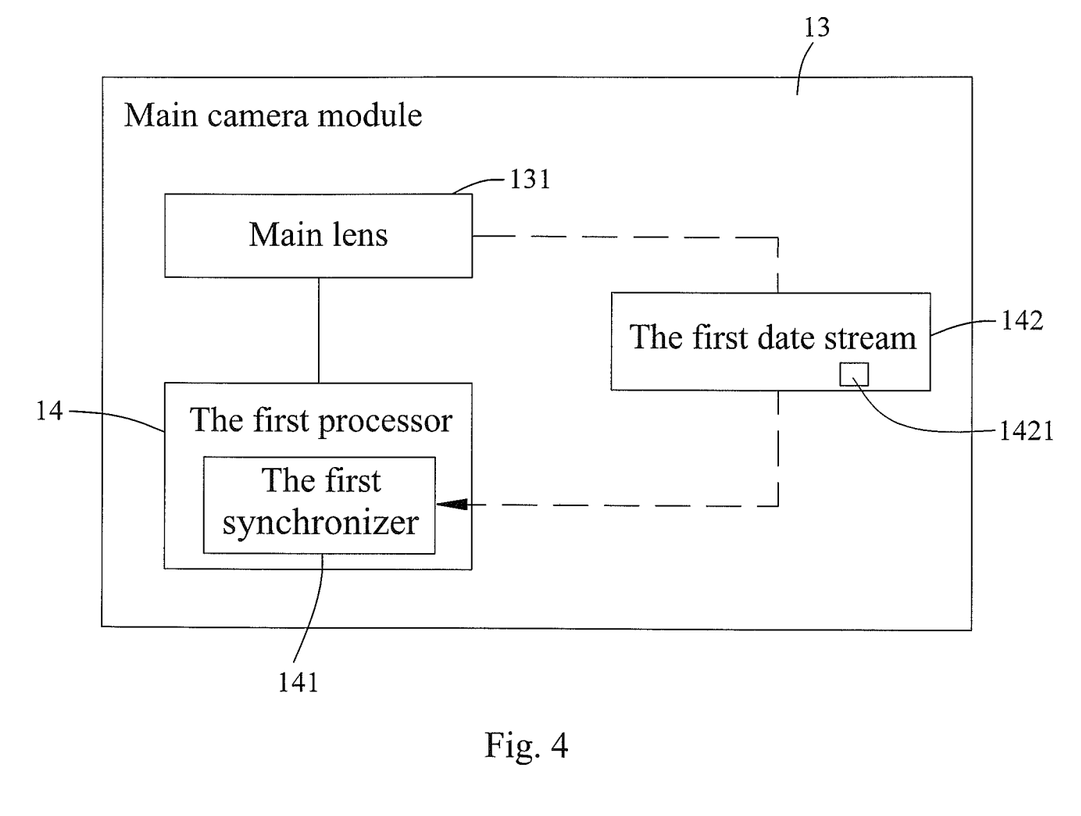
FIG. 4 is a block diagram of the main camera module of the camera set with connecting structure in accordance with the present invention.

The main camera module 13 has a main lens 131, an infrared light source 132 and a functional indicator light 133 placed on a front side of the main housing 11. The main lens is a TOF (Time of flight) lens. With reference to FIG. 4, the main camera module 13 comprises a first processor 14. The first processor 14 has a first synchronizer 141 which is able to receive a first data stream 142 coming from the main lens 131. The main camera module 13 has a main connector 134 mounted on the side of the main housing 11. The main connector 134 is preferred to be a USB (Universal Serial Bus) 2.0 or the above type of female connector.

With reference to FIG. 1 to FIG. 3, the detachable camera 20 is a RGB camera having an expanded housing 21 with a detachable camera module 23 mounted therein. The expanded housing 21 preferably has similar or the same size and shape to the main housing 11 of the main camera 10. The expanded housing 21 comprises a join structure 22 having at least two rods 221 and at least two screwing plates 222 mounted thereon. The at least two rods 221 are vertically mounted on a front part of a side of the expanded housing 21. The at least two rods 221 are able to insert to the at least two pits 121 respectively to locate the main camera 10 and the detachable camera 20. The at least two screwing plates 222 are vertically mounted on a rear part of the side of the expanded housing 21 with one end of the screwing plates being extruded from the expanded housing 21. The at least two screwing plates 222 are able to respectively embed in the grooves 122 of the main housing 11. Each screwing plate 222 has a counterbore 223 at a center of the screwing plate 222. The detachable camera 20 is detachably fastened aside with the main camera 10 by a screw 224 screwed through the screw hole 123 of the main housing 11 and the counterbore 223 of the expanded housing 21.

The detachable camera module 23 has an expanded lens 231. The expanded lens 231 is preferred to be a color lens. The detachable camera module 23 has a first expanded connector 232 mounted on the side of the expanded housing 21. The first expanded connector 232 is preferred to be a USB 2.0 or the above type of male connector. The main camera module 13 is able to be electrically connected with the detachable camera module 23 by the first expanded connector 232 being inserted with the main connector 134.

Figure 5:
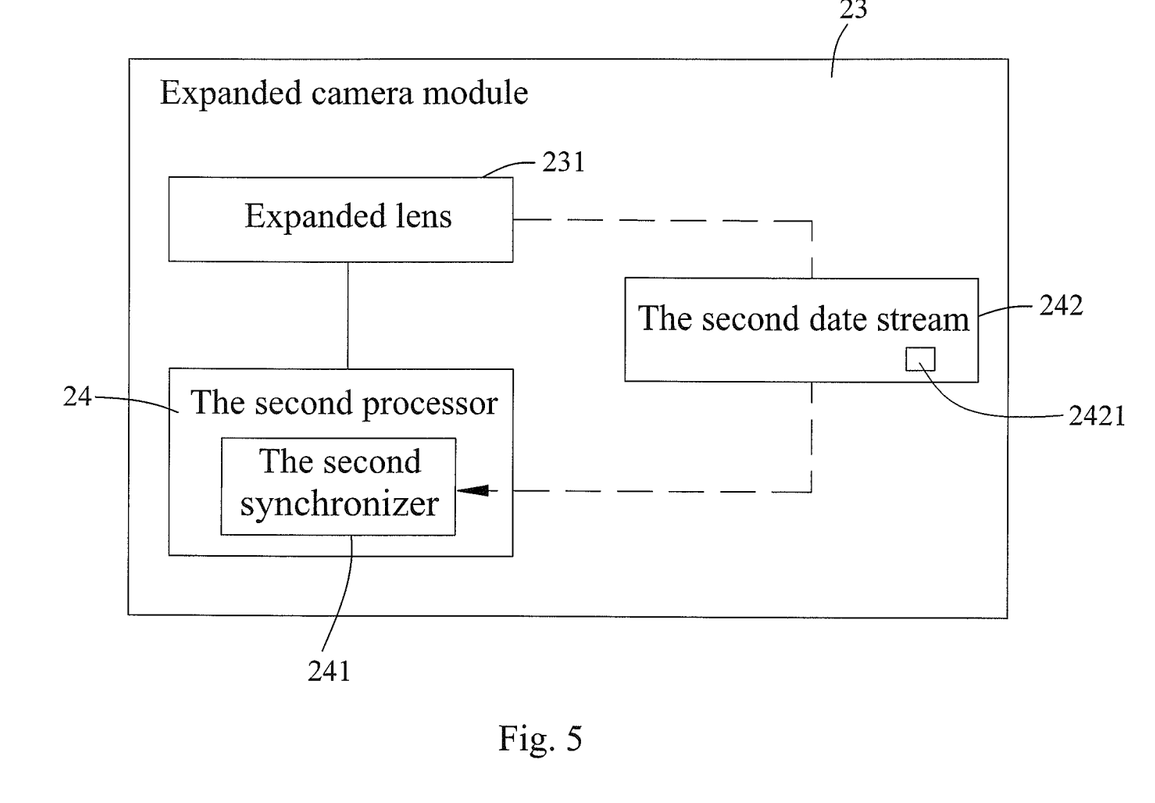
FIG. 5 is a block diagram of the detachable camera module of the camera set with connecting structure in accordance with the present invention.

With reference to FIG. 5, the detachable camera module 23 comprises a second processor 24. The second processor 24 has a second synchronizer 241 which is able to receive a second data stream 242 coming from the expanded lens 231. The first synchronizer 141 and the second synchronizer 241 are able to respectively control synchronized time sequences (1421, 2421) of the first data stream 142 and the second data stream 242.

In practice, the detachable camera module 23 may be set as a Master and controls the main camera module 13 to achieve the synchronized time sequence (1421, 2421) of the first data streams 142 and the second data stream 242. The second synchronizer 241 of the detachable camera module 23 synchronizes horizontal synchronize singles (Hsync) and the time sequences (1421, 2421) of the frames of the detachable camera module 23 and of the main camera module 13. Thus, the synchronized first data stream 142 and the second data stream 242 may be combined and displayed side by side. Furthermore, the synchronized first and second data streams 142, 242 may be processed to remove signal noises and to calibrate distortions thereof. In the preferred embodiment, the main and detachable cameras 10, 20 may be used independently or integrally to provide more customized applications. With the aforementioned disclosures, more than two cameras serial connected are also possible in the other applications.

Besides the first expanded connector 232, the detachable camera module 23 has a second expanded connector 233 mounted on the other side of the expanded housing 21. The second expanded connector 233 may be a USB 3.0 or a USB type C female connector. Users may charge the main camera 10 and the detachable camera 20 via the second expanded connector 233. The first data stream 142 and the second data stream 242 can also be exported to another electronic device via the second expanded connector 233. Since the main connector 134 only provides electric power to the main camera 10, electric power of the main connector 134 may be less than electric power of the second expanded connector 233.

Figure 7:
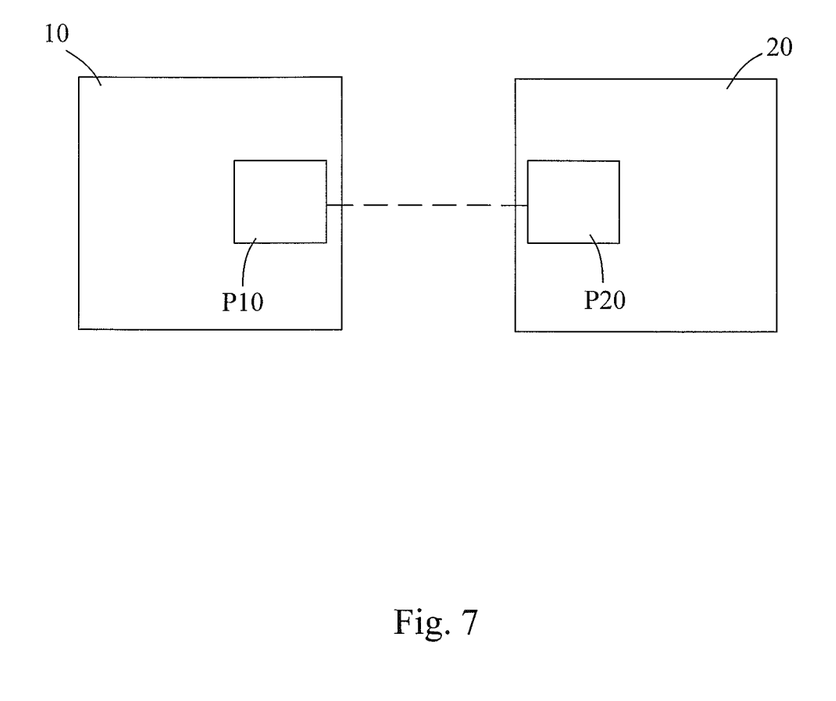
FIG. 7 is a block diagram of electric power of the main camera and the detachable camera in accordance with the present invention.

Except for the USB 2.0 connector as mentioned above, the main connector 134 and the first expanded connector 232 may also be USB 3.0 type of female and male connector as desired. Since USB 3.0, USB type-C or higher level USB connectors have sufficient electric power output, the main camera 10 and the detachable camera 20 are able to be supplied with sufficient power simply via the second expanded connector 233. The main camera 10 can still have sufficient power even when the power is partially consumed by the detachable camera 20. Hence, with reference to FIG. 7, electric power P20 of the second expanded connector 233 must be equal to or higher than electric power P10 of the main connector 134.

Accepting the USB 3.0 type of female connector, the second expanded connector 233 and the main connector 134 may be changed to the USB 3.0 type of male connector. Accordingly, the first expanded connector 232 as mentioned above should correspondingly change to the USB 3.0 type of female connector.

Besides the USB connector, other type of connectors may also be applied by the present invention, like an IEEE1394 (Institute of Electrical and Electronics Engineers) type of connector. The main camera 10 and the detachable camera 20 can also use cameras other than TOF or RGB cameras as described above. The main camera 10 and the detachable camera 20 may have the same or similar functions or may use cameras with different functions, like an infrared camera.

When using the present invention to record an object, the main camera 10 and the detachable camera 20 are able to be activated at the same time. The main camera 10 and the detachable camera 20 can also be activated or disabled individually by software controlling.

Since the main camera 10 and the detachable camera 20 are integrated by the docking structure 12 and the join structure 22, the present invention is therefore easy to be assembled. Signals coming from the main camera 10 and the detachable camera 20 can be integrated and exported simply through the second expanded connector 233. The aforementioned singles may be, but are not limited to, a depth signal with three-dimensional information, a color signal, the first data stream 142 and the second data stream 242.

The main camera 10 and the detachable camera 20 can be easily separated by simply loosening the screws 224. The main camera 10 can be utilized individually after being taken apart from the detachable camera 20. On this circumstance, the present invention may achieve a lower power consumption since only the main camera 10 needs to be charged. When the detachable camera 20 is required, it can be quickly assembled with the main camera 10 and provides sufficient power to both camera devices via the second expanded connector 233.

Figure 6:
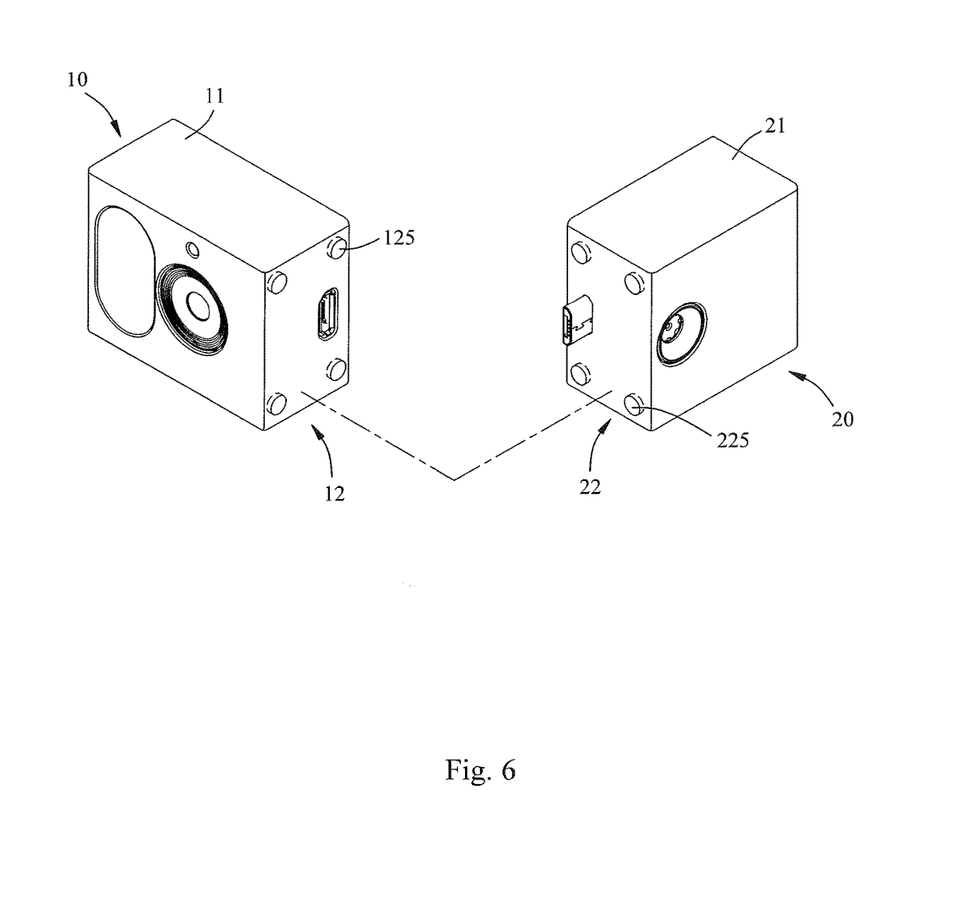
FIG. 6 is an illustration of the second embodiment of a camera set with connecting structure in accordance with the present invention.

With reference to FIG. 6, a second embodiment of the docking structure 12 and the join structure 22 of the present invention is presented. The clocking structure 12 in the second embodiment comprises four magnetic elements 125 mounted on the side of the main housing 11. The join structure 22 in the second embodiment also comprises four corresponded magnetic elements 225 mounted on the side of the expanded housing 21. Thus, the main camera 10 and the detachable camera 20 can be detachably assembled with magnetic elements 125, 225 attracted. Numbers of magnetic elements 125, 225 are not limited to four as described in the second embodiment of the present invention. Multiple magnetic elements 125, 225 may be used to assemble the main camera 10 and the detachable camera 20 as required.

What is claimed is:

1. A camera set with connecting structure comprising:
    a main camera comprising a time of flight camera having a main housing with a main camera module mounted therein;
    a docking structure and a main connector mounted on a side of the main housing, wherein:
        the main camera module comprises a first processor and a main lens mounted on a front side of the main housing; and
        the first processor comprises a first synchronizer receiving a first data stream from the main lens;
    a detachable camera comprising a color camera having an expanded housing with a detachable camera module mounted therein;
    a join structure and a first expanded connector mounted on a side of the expanded housing, wherein:
        the join structure is detachably connected with the docking structure;
        the first expanded connector is electrically connected with the main connector;
        the detachable camera module comprises a second processor and an expanded lens mounted on a front side of the expanded housing;
        the second processor comprises a second synchronizer receiving a second data stream came from the expanded lens; and
        the first synchronizer and the second synchronizer controlling time sequences of the first data stream and the second data stream;
    a second expanded connector mounted on a side of the expanding housing different from the first expanded connector; and
    an electric power of the second expanded connector equal to or higher than an electric power of the main connector, wherein:
        the detachable camera module is set as a master and controls the main camera module to achieve the synchronized time sequence of the first data stream and the second data stream; and
        the second synchronizer of the detachable camera module synchronizes horizontal synchronize singles and the time sequences of frames of the detachable camera module and the main camera module.

2. The camera set with connecting structure as claimed in claim 1, wherein:
    the docking structure comprises at least two pits and at least two grooves mounted on the main housing;
    the at least two pits are vertically mounted on a front part of the side of the main housing;
    the at least two grooves are vertically mounted on a rear part of the side of the main housing;
    each groove comprises a screw hole placed in an inner side;
    the join structure comprises at least two rods and at least two screwing plates mounted on the expanded housing;
    the at least two rods are vertically mounted on a front part of the side of the expanded housing;
    the at least two rods are respectively inserted to the at least two pits to locate the main camera and the detachable camera;
    the at least two screwing plates are vertically mounted on a rear part of the side of the expanded housing;
    the at least two screwing plates are respectively embedded in the at least two grooves of the main housing;
    each screwing plate has a counterbore at a center; and
    the main camera and the detachable camera are detachably assembled by a screw screwed through the counterbore of each screwing plate and the screwing hole of each groove.

3. The camera set with connecting structure as claimed in claim 1, wherein:
    the docking structure comprises multiple magnetic elements mounted on the side of the main housing;
    the join structure comprises multiple magnetic elements mounted on the side of the expanded housing; and
    the main camera and the detachable camera are detachably assembled with the multiple magnetic elements of the docking structure and the join structure attracted together.

4. The camera set with connecting structure as claimed in claim 1, further comprising an infrared light source mounted on the front side the main housing.

5. The camera set with connecting structure as claimed in claim 4, wherein:
    the docking structure comprises at least two pits and at least two grooves mounted on the main housing;
    the at least two pits are vertically mounted on a front part of the side of the main housing;
    the at least two grooves are vertically mounted on a rear part of the side of the main housing;
    each groove comprises a screw hole placed in an inner side;
    the join structure comprises at least two rods and at least two screwing plates mounted on the expanded housing;
    the at least two rods are vertically mounted on a front part of the side of the expanded housing;
    the at least two rods are respectively inserted to the at least two pits to locate the main camera and the detachable camera;
    the at least two screwing plates are vertically mounted on a rear part of the side of the expanded housing;
    the at least two screwing plates are respectively embedded in the at least two grooves of the main housing;
    each screwing plate has a counterbore at a center; and
    the main camera and the detachable camera are detachably assembled by a screw screwed through the counterbore of each screwing plate and the screwing hole of each groove.

6. The camera set with connecting structure as claimed in claim 4, wherein:
    the docking structure comprises multiple magnetic elements mounted on the side of the main housing;
    the join structure comprises multiple magnetic elements mounted on the side of the expanded housing; and
    the main camera and the detachable camera are detachably assembled with the multiple magnetic elements of the docking structure and the join structure attracted together.

7. The camera set with connecting structure as claimed in claim 4, wherein:

the main connector and the second expanded connector of the detachable camera are a female universal serial bus connector; and the first expanded connector is a male universal serial bus connector.

8. The camera set with connecting structure as claimed in claim 7, wherein:
the docking structure comprises at least two pits and at least two grooves mounted on the main housing;
the at least two pits are vertically mounted on a front part of the side of the main housing;
the at least two grooves are vertically mounted on a rear part of the side of the main housing;
each groove comprises a screw hole placed in an inner side;
the join structure comprises at least two rods and at least two screwing plates mounted on the expanded housing;
the at least two rods are vertically mounted on a front part of the side of the expanded housing;
the at least two rods are respectively inserted to the at least two pits to locate the main camera and the detachable camera;
the at least two screwing plates are vertically mounted on a rear part of the side of the expanded housing;
the at least two screwing plates are respectively embedded in the at least two grooves of the main housing;
each screwing plate has a counterbore at a center; and
the main camera and the detachable camera are detachably assembled by a screw screwed through the counterbore of each screwing plate and the screwing hole of each groove.

9. The camera set with connecting structure as claimed in claim 7, wherein:
the docking structure comprises multiple magnetic elements mounted on the side of the main housing;
the join structure comprises multiple magnetic elements mounted on the side of the expanded housing; and
the main camera and the detachable camera are detachably assembled with the multiple magnetic elements of the docking structure and the join structure attracted together.

10. The camera set with connecting structure as claimed in claim 4, wherein the main camera module comprises a functional indicator light mounted on the front side of the main housing.

11. The camera set with connecting structure as claimed in claim 10, wherein:
the docking structure comprises at least two pits and at least two grooves mounted on the main housing;
the at least two pits are vertically mounted on a front part of the side of the main housing;
the at least two grooves are vertically mounted on a rear part of the side of the main housing;
each groove comprises a screw hole placed in an inner side;
the join structure comprises at least two rods and at least two screwing plates mounted on the expanded housing;
the at least two rods are vertically mounted on a front part of the side of the expanded housing;
the at least two rods are respectively inserted to the at least two pits to locate the main camera and the detachable camera;
the at least two screwing plates are vertically mounted on a rear part of the side of the expanded housing;
the at least two screwing plates are respectively embedded in the at least two grooves of the main housing;
each screwing plate has a counterbore at a center; and
the main camera and the detachable camera are detachably assembled by a screw screwed through the counterbore of each screwing plate and the screwing hole of each groove.

12. The camera set with connecting structure as claimed in claim 10, wherein:
the docking structure comprises multiple magnetic elements mounted on the side of the main housing;
the join structure comprises multiple magnetic elements mounted on the side of the expanded housing; and
the main camera and the detachable camera are detachably assembled with the multiple magnetic elements of the docking structure and the join structure attracted together.

13. A camera set with connecting structure comprising:
a main camera comprising a main housing with a main camera module mounted therein;
a docking structure and a main connector mounted on a side of the main housing, wherein:
the docking structure comprises at least two pits and at least two grooves mounted on the main housing;
the at least two pits are vertically mounted on a front part of the side of the main housing;
the at least two grooves are vertically mounted on a rear part of the side of the main housing;
each groove comprises a screw hole placed in an inner side; and
the main camera module comprises a main lens mounted on a front side of the main housing;
a detachable camera comprising an expanded housing with a detachable camera module mounted therein;
a join structure and a first expanded connector mounted on a side of the expanded housing, wherein:
the join structure is detachably connected with the docking structure;
the first expanded connector is electrically connected with the main connector;
the detachable camera module comprises an expanded lens mounted on a front side of the expanded housing;
the join structure comprises at least two rods and at least two screwing plates mounted on the expanded housing;
the at least two rods are vertically mounted on a front part of the side of the expanded housing;
the at least two rods are respectively inserted to the at least two pits to locate the main camera and the detachable camera;
the at least two screwing plates are vertically mounted on a rear part of the side of the expanded housing;
the at least two screwing plates are respectively embedded in the at least two grooves of the main housing;
each screwing plate has a counterbore at a center; and
the main camera and the detachable camera are detachably assembled by a screw screwed through the counterbore of each screwing plate and the screwing hole of each groove;
a second expanded connector mounted on a side of the expanding housing different from the first expanded connector; and
an electric power of the second expanded connector equal to or higher than an electric power of the main connector.

14. A camera set with connecting structure comprising:
a main camera comprising a main housing with a main camera module mounted therein;

a docking structure and a main connector mounted on a side of the main housing, wherein:
  the docking structure comprises multiple magnetic elements mounted on the side of the main housing; and
  the main camera module comprises a main lens mounted on a front side of the main housing;
a detachable camera comprising an expanded housing with a detachable camera module mounted therein;
a join structure and a first expanded connector mounted on a side of the expanded housing, wherein:
  the join structure is detachably connected with the docking structure;
  the first expanded connector is electrically connected with the main connector;
  the detachable camera module comprises an expanded lens mounted on a front side of the expanded housing;
  the join structure comprises multiple magnetic elements mounted on the side of the expanded housing; and
  the main camera and the detachable camera are detachably assembled with the multiple magnetic elements of the docking structure and the join structure attracted together;
a second expanded connector mounted on a side of the expanding housing different from the first expanded connector; and
an electric power of the second expanded connector equal to or higher than an electric power of the main connector.

* * * * *